United States Patent
Williams et al.

(10) Patent No.: US 11,498,392 B2
(45) Date of Patent: Nov. 15, 2022

(54) SYSTEM AND METHOD FOR REDUCING AIR PRESSURE IN A VEHICLE TRUNK TO ASSIST IN CLOSING A TRUNK DOOR

(71) Applicant: Toyota Motor Engineering & Manufacturing North America, Inc., Plano, TX (US)

(72) Inventors: Paxton S. Williams, Milan, MI (US); Scott Louis Frederick, Brighton, MI (US); Scott P. Robison, Dexter, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 942 days.

(21) Appl. No.: 16/278,460

(22) Filed: Feb. 18, 2019

(65) Prior Publication Data
US 2020/0262270 A1 Aug. 20, 2020

(51) Int. Cl.
*B60H 1/24* (2006.01)
*E05F 15/71* (2015.01)
*B60H 1/32* (2006.01)
*B60H 1/00* (2006.01)

(52) U.S. Cl.
CPC ............. *B60H 1/248* (2013.01); *E05F 15/71* (2015.01); *B60H 1/00557* (2013.01); *B60H 1/00735* (2013.01); *B60H 2001/3248* (2013.01)

(58) Field of Classification Search
CPC ..................... B60H 1/248; B60H 1/00557
USPC ................................................. 454/69–165
See application file for complete search history.

(56) References Cited

U.S. PATENT DOCUMENTS

| | | | |
|---|---|---|---|
| 6,361,429 B1* | 3/2002 | Pawlak, III | B60H 1/248 454/139 |
| 9,656,534 B2* | 5/2017 | Wade | B60H 1/00828 |
| 10,118,577 B1* | 11/2018 | Sweeney | G05D 1/0088 |
| 10,823,285 B2* | 11/2020 | Winkel | F16H 61/4157 |
| 10,906,375 B2* | 2/2021 | Scholz | B60H 1/00735 |

(Continued)

FOREIGN PATENT DOCUMENTS

| | | |
|---|---|---|
| CN | 201333913 Y | 10/2009 |
| DE | 202011103164 U1 | 10/2011 |
| JP | 3732689 B2 | 1/2006 |

*Primary Examiner* — Ko-Wei Lin
(74) *Attorney, Agent, or Firm* — Christopher G. Darrow; Darrow Mustafa PC (57) ABSTRACT

System, methods, and other embodiments described herein relate to assisting in closing a trunk door of a vehicle by leveraging a Heating, Ventilation and Air-conditioning (HVAC) system in the vehicle. In one embodiment, a method includes detecting a position of the trunk door, and when the position of the trunk door is an open position, determining whether to activate the HVAC system to reduce air pressure in a trunk of the vehicle, where the trunk and the HVAC system are fluidly connected by an air duct. The method includes, in response to determining to activate the HVAC system to reduce air pressure in the trunk, pumping air out of the trunk through the air duct such that at least some of any increased air pressure caused by a trunk door closure is removed from the trunk. The method includes, when the position of the trunk door has changed from the open position to a closed position, deactivating the HVAC system to stop pumping air out from the trunk.

20 Claims, 5 Drawing Sheets

(56) References Cited

U.S. PATENT DOCUMENTS

| | | | |
|---|---|---|---|
| 2003/0109214 A1* | 6/2003 | Yamashiro | B60H 1/00428 |
| | | | 454/165 |
| 2008/0115517 A1 | 5/2008 | Tacey et al. | |
| 2009/0088062 A1* | 4/2009 | Major | H01M 10/625 |
| | | | 454/70 |
| 2009/0088064 A1* | 4/2009 | Lin | B60H 1/248 |
| | | | 454/141 |
| 2009/0318068 A1* | 12/2009 | Iida | B60H 1/00742 |
| | | | 454/75 |
| 2011/0162901 A1* | 7/2011 | Lucas | B60L 1/003 |
| | | | 180/68.2 |
| 2014/0259928 A1 | 9/2014 | Morris | |
| 2014/0273784 A1* | 9/2014 | Wade | B60H 1/248 |
| | | | 454/162 |
| 2014/0273786 A1* | 9/2014 | Wade | B60H 1/00735 |
| | | | 454/75 |
| 2017/0158021 A1* | 6/2017 | Iacovoni | B60H 1/00835 |
| 2017/0342761 A1 | 11/2017 | Conner | |
| 2018/0319253 A1* | 11/2018 | Martinez | B60H 1/249 |
| 2019/0084501 A1* | 3/2019 | Salazar Prieto | B60R 13/0815 |
| 2020/0164899 A1* | 5/2020 | Yasui | G06Q 50/30 |
| 2020/0262268 A1* | 8/2020 | Williams | B60H 1/0065 |

* cited by examiner

SYSTEM AND METHOD FOR REDUCING AIR PRESSURE IN A VEHICLE TRUNK TO ASSIST IN CLOSING A TRUNK DOOR

TECHNICAL FIELD

The subject matter described herein relates, in general, to a system and method for reducing air pressure in a trunk of a vehicle to assist in closing a door of the trunk.

BACKGROUND

Closing a trunk door of a vehicle may lead to an increase in air pressure in a trunk of the vehicle, and the increase in air pressure in the trunk may exert a counterforce on the trunk door as the trunk door closes. Reducing the air pressure in the trunk reduces a force for closing the trunk door, which can alleviate the amount of energy a user has to apply to close the trunk door. Further, reducing the energy exerted by the user may, for example, reduce wear and tear on the trunk door, an opening receiving the trunk door, and an opening/closing mechanism that moves the trunk door from an open position to a closed position.

SUMMARY

In one embodiment, example systems and methods relate to a manner of assisting a user in closing a trunk door. As noted above, a user may experience difficulty closing the trunk door due to an increase in air pressure in a trunk of a vehicle as the user closes the trunk door.

In one embodiment, a method for assisting in closing a trunk door of a vehicle is disclosed. The method includes detecting a position of the trunk door and when the position of the trunk door is an open position, determining whether to activate a Heating, Ventilation and Air-conditioning (HVAC) system to reduce air pressure in a trunk of the vehicle, where the trunk and the HVAC system are fluidly connected by an air duct. The method includes, in response to determining to activate the HVAC system, pumping air out of the trunk through the air duct such that at least some of any increased air pressure caused by a trunk door closure is removed from the trunk. The method also includes when the position of the trunk door has changed from the open position to a closed position, deactivating the HVAC system to stop pumping air out from the trunk.

In another embodiment, a trunk pressure-relief system for assisting in closing a trunk door of a vehicle is disclosed. The trunk pressure-relief system includes one or more sensors operable to detect a position of the trunk door, an HVAC system, one or more processors, and a memory communicably coupled to the one or more processors. The memory stores an air pressure control module including instructions that when executed by the one or more processors cause the one or more processors to, when the position of the trunk door is in an open position, determine whether to activate the HVAC system to reduce air pressure in a trunk of the vehicle, where the trunk and the HVAC system are fluidly connected by an air duct. In response to determining to activate the HVAC system, the HVAC system pumps air out of the trunk through the air duct such that at least some of any increased air pressure caused by a trunk door closure is removed from the trunk. The memory stores an HVAC control module including instructions that when executed by the one or more processors cause the one or more processors to, when the position of the trunk door has changed from the open position to a closed position, deactivate the HVAC system to stop pumping air out from the trunk.

In another embodiment, a trunk pressure-relief system for assisting in closing a trunk door of a vehicle is disclosed. The trunk pressure-relief system includes one or more sensors operable to detect a position of the trunk door, an HVAC system having a blower in a trunk of the vehicle, one or more processors, and a memory communicably coupled to the one or more processors. The memory stores an air pressure control module including instructions that when executed by the one or more processors cause the one or more processors to, when the position of the trunk door is in an open position, determine whether to activate the HVAC system to reduce air pressure in a trunk of the vehicle. In response to determining to activate the HVAC system, the HVAC system pumps air out of the trunk through the blower such that at least some of any increased air pressure caused by a trunk door closure is removed from the trunk. The memory stores an HVAC control module including instructions that when executed by the one or more processors cause the one or more processors to, when the position of the trunk door has changed from the open position to a closed position, deactivate the HVAC system to stop pumping air out from the trunk.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with a manner of reducing air pressure in a trunk of a vehicle when a trunk door of the vehicle is closing are disclosed. As noted, closing the trunk door may lead to a buildup of air pressure in the trunk, which exerts a counterforce on the trunk door, making a user apply more force to close the trunk door.

To prevent an increase in air pressure and reduce the counterforce, some vehicles may have pressure relief valves, which open and vent air from the trunk to an external environment when the air pressure in the trunk increases as the trunk door closes. However, such pressure relief valves may not vent the air fast enough for the sudden increase in air pressure caused by the trunk door as the trunk door closes. In the case where the pressure relief valves are large enough to vent the air fast enough, the valves may permit unwanted external noises and/or fumes into the trunk.

Accordingly, in one embodiment, the disclosed approach exploits a heating, ventilation, and air-conditioning (HVAC) system to reduce the air pressure in the trunk by utilizing the HVAC system to pump air out of the trunk when a trunk door is closing. The HVAC system may pump air out of the trunk at a faster rate than air being exhausted through the pressure relief valves, and as such, the disclosed approach has a quicker response time when a trunk door is determined to be closing. Further, the HVAC system may pump more air out of the trunk than air in the trunk being displaced by the trunk door closing. Thus, with a lower air pressure in the trunk, the disclosed approach may suck the trunk door in as the trunk door closes, which may alleviate some of the force to be exerted by the user. In contrast, the prior art may not provide significant relief to the user closing the trunk door, as the pressure relief valves may only exhaust air displaced by the trunk door closing.

In one approach, a trunk pressure-relief system may include an air pressure control module, which determines whether to activate or deactivate the HVAC system. The trunk pressure-relief system detects a position of a trunk door by receiving sensor data from sensors, e.g. cameras, trunk door position sensors, etc. The sensor data may include the position of the trunk door such as whether the trunk door is in a closed position or in an open position. When the trunk door is in the open position, the trunk pressure-relief system, specifically the air pressure control module may determine whether to activate the HVAC system to pump air out of the trunk based on a number of factors such as the open/closed status of doors in the vehicles, the open/closed status of the windows in a vehicle, etc. If the HVAC system is activated, air is pumped out of the trunk, reducing the air pressure in the trunk, which may reduce the amount of force a user has to apply to close the trunk door. A trunk pressure-relief system may include an HVAC control module, which activates and deactivates the HVAC system and may adjust an HVAC system rate of pumping air out of the trunk. The HVAC system rate may be raised to exert more force (e.g., a stronger pull) on the trunk door and conversely, the HVAC system rate may be lowered to exert less force (e.g., a weaker pull) on the trunk door. When the trunk door moves from the open position to the closed position, the HVAC control module may deactivate the HVAC system and prevent further air from being pumped out of the trunk.

Air ducts fluidly connect the trunk to the HVAC system. In one example, the HVAC system may be fluidly connected to the trunk through an air duct such that the HVAC system pumps air out of trunk through the air duct and exhausts the air to an external environment. In another example, the HVAC system, the cabin and the trunk may be fluidly connected through an air duct such that the HVAC system pumps air out of the cabin and exhausts the air to an external environment, while the air in the trunk may move through the air duct into the cabin to replace the exhausted air.

Figure 1:
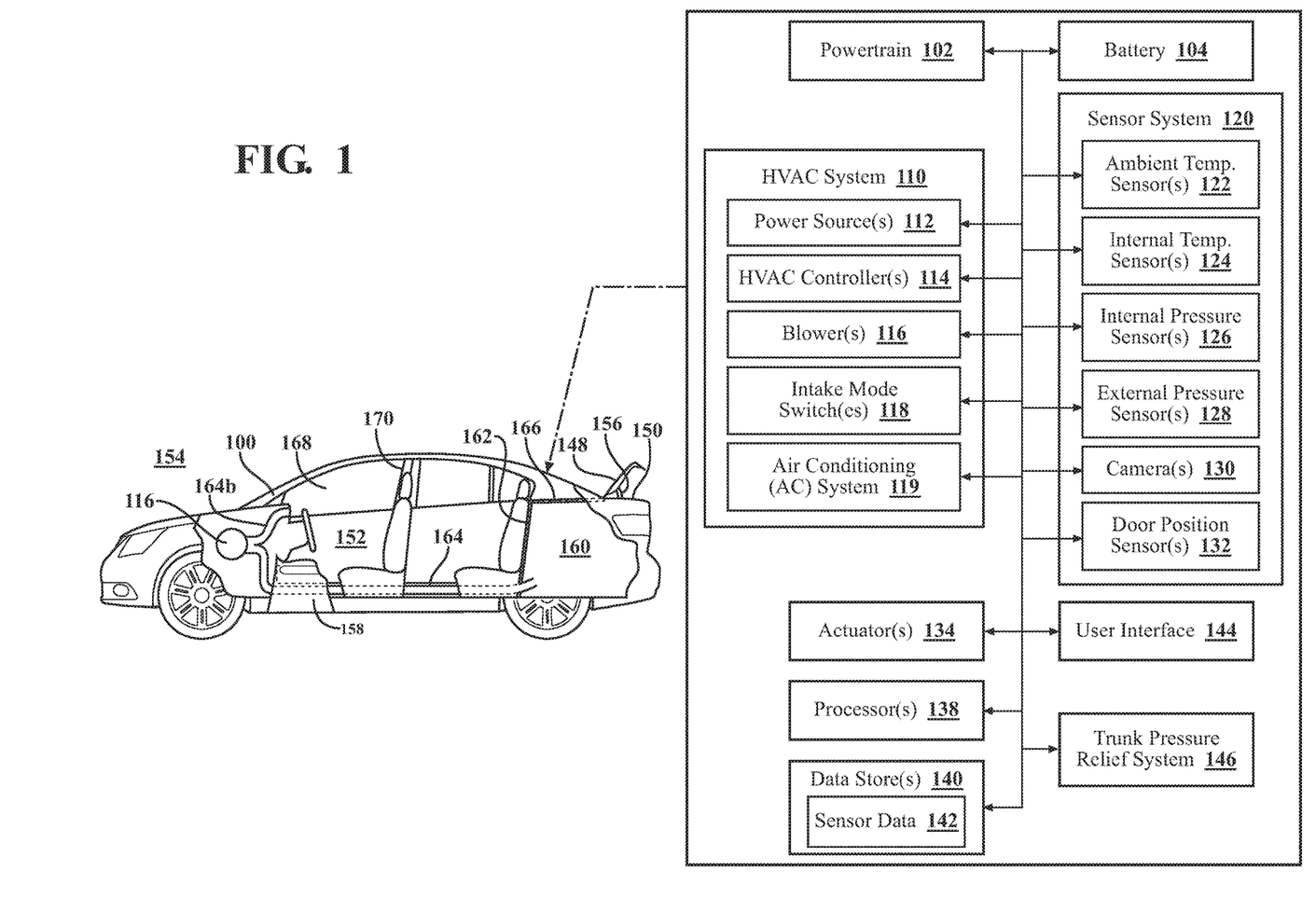
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that has a trunk and a trunk door, and thus benefits from the functionality discussed herein.

The vehicle 100 includes an HVAC system 110, a sensor system 120, and a trunk pressure-relief system 146. The vehicle 100 also includes various elements. It will be understood that in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

The vehicle 100 includes a cabin 152, a trunk 160 partitioned from the cabin 152 by a partition wall 162 and a rear ledge 166 in a rear portion of the vehicle 100. The partition wall 162 engages the rear ledge 166 and extends downwards from the rear ledge 166, such that the rear ledge 166 and the partition wall separate the trunk from the cabin 152.

The vehicle 100 includes a trunk door 148, and a trunk door opening 150, which receives the trunk door 148. In one embodiment, the vehicle 100 may include a hinge 156, connecting the trunk door 148 to the vehicle 100. The vehicle 100 may further include doors 158 and windows 168.

The vehicle 100 includes an air duct 164 that fluidly connects the HVAC system 110, specifically a blower to the trunk 160. In one embodiment, the HVAC system 110 and the cabin 152 may be fluidly connected. In other words, the cabin 152, the HVAC system 110, and the trunk 160 may be fluidly connected. As an example, the air duct 164 may extend from a portion of the HVAC system 110 within the cabin 152 to the trunk 160. As another example, the air duct 164 may extend from the cabin 152 into the trunk 160 through, e.g., the partition wall 162 or a floor of the trunk 160. In such an embodiment, the vehicle 100 may include a blower 116, fluidly connected to the trunk 160 and the cabin 152, and when the HVAC system 110 may pump air out of the cabin and the trunk.

In another embodiment, the cabin 152 and the trunk 160 may not be fluidly connected. As an example, the HVAC system 110 may have a blower fluidly connected to two air ducts 164. The two air ducts may be separated by a valve, such that while one of the two air ducts is fluidly connected to the cabin and the other of the two air ducts is fluidly connected to the trunk, the two air ducts are not fluidly connected. In such a case, the valve may permit the HVAC system 110 to pump air out of the trunk 160 without pumping air out of the cabin 152.

In another embodiment, the HVAC system 110 may have a blower 116 fluidly connected to the trunk 160 through an air duct, and a second blower 116*b* fluidly connected to the cabin 152 through a second air duct. In such an example, the trunk 160 and the cabin 152 may not be fluidly connected such that the HVAC system may pump air out of the trunk 160 without pumping air out of the cabin 152.

The air duct may define an air passage for air being distributed into and pumped out of the cabin 152 and/or the trunk 160. The air duct 164 may be a tube or an opening. As an example, an air duct 164 from a blower 116 to the trunk 160 may be an opening in the partition wall or the floor of the trunk 160. Additionally and/or alternatively, the air duct 164 may be a tube extending from the blower 116 to the trunk 160. As another example, a second air duct may be a tube extending from the blower 116 to the cabin 152. The second air duct extending from the blower 116 to the cabin 152 may be structurally different from the air duct 164 extending from the blower to the trunk, and the second air duct may be of a different material from the air duct. The air ducts may be formed of any suitable plastic material, fibreglass material, and/or metal material.

The HVAC system 110 can be configured to change the environment or climate of the trunk 160 of the vehicle 100. Some of the possible elements of the HVAC system 110 are shown in FIG. 1 and will be described. It will be understood that it is not necessary for the HVAC system 110 to have all of the elements shown in FIG. 1 or described herein. The HVAC system 110 can have any combination of the various elements shown in FIG. 1. Further, the HVAC system 110 can have additional elements to those shown in FIG. 1.

The HVAC system 110 can include an air conditioning (AC) system 119. The AC system 119 can have any configuration to allow for cooling and/or humidity control for at least a portion of the vehicle 100. In one or more arrangements, the AC system 119 can include various elements that can be arranged in any suitable manner and/or can be operatively connected to each other in any suitable manner.

The HVAC system 110 can include one or more power sources 112 to provide mechanical or electrical power to one or more elements of the HVAC system 110. In one or more arrangements, the power source(s) 112 can include the battery 104. Alternatively or in addition, the power source(s) 112 can include other power sources. For example, the power source(s) 112 can include additional batteries and/or generators.

The HVAC system 110 can include one or more blowers 116 to direct and/or cause the movement of air or other fluid/gas. The one or more blowers 116 fluidly connect the HVAC system 110 and the trunk 160. As used herein, "air" can include any gaseous fluid. For example, air can include environmental gas in and/or around the vehicle 100. The blower(s) 116 can be configured to direct and/or cause the movement of air from inside the trunk 160 to the external environment 154 as well as from the external environment 154 into the trunk 160.

In one or more arrangements, the blower(s) 116 can include a blower motor and one or more fans to move a quantity of air from inside the trunk 160, through air ducts which fluidly connect the trunk 160 to the external environment 154. In one or more arrangements, the blower(s) 116 can be powered by the powertrain 102, the battery 104, and/or the power source(s) 112.

The HVAC system 110 can include one or more intake mode switches 118 to control the source of air being introduced to the HVAC system 110 and/or the vehicle 100. In one or more arrangements, the intake mode switch(es) 118 can be configured to allow the selection of a source of air being introduced to the blower(s) 116. For instance, the source of air can be outside {01125007} 7 of the vehicle 100 and/or from an external environment 154, referred to as "fresh mode air source". Additionally, the source of air can be within the vehicle 100, referred to as "recirculation mode air source." In one or more arrangements, the intake mode switch(es) 118 can be operated to change the air source selection between a fresh mode air source, a recirculation mode air source, and/or a mix of both modes.

In the fresh air mode, the trunk 160 is fluidly connected to the external environment 154. As such, in addition to allowing air from outside of the trunk 160 and/or from an external environment 154 to be introduced to the blower(s) 116, the intake mode switch(es) 118 can allow the blower(s) 116 to pump (or suck) air from the trunk 160 out and to the external environment 154. In other words, when the cabin 152 is fluidly connected to the external environment 154, the blower(s) 116 can pump air out of the cabin 152 and exhaust the pumped air to the external environment 154.

The HVAC system 110 can include one or more HVAC controllers 114. "Controller" means any component or group of components that are configured to execute any of the processes described herein or any form of instructions to carry out such processes or cause such processes to be performed. Specifically, the HVAC controllers 114 may be configured to execute the instructions in the trunk pressure-relief system 146. The HVAC controller(s) 114 may be implemented with one or more general-purpose and/or one or more special-purpose processors. Examples of suitable HVAC controller(s) 114 include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a processor. The HVAC controller(s) 114 can include at least one hardware circuit (e.g., an integrated circuit) configured to carry out instructions contained in program code. In arrangements in which there is a plurality of HVAC controllers 114, such HVAC controllers 114 can work independently from each other or one or more HVAC controllers 114 can work in combination with each other.

The HVAC controller 114 can be configured to cause, directly or indirectly, one or more elements of the HVAC system 110 to be activated or deactivated. As used herein, "cause" or "causing" means to make, force, compel, direct, command, instruct, and/or enable an event or action to occur or at least be in a state where such event or action may occur, either in a direct or indirect manner. In one or more arrangements, the HVAC controller 114 can be an HVAC electronic control unit (ECU).

The sensor system 120 may include one or more sensors 122, 124, 126, 128, 130, 132. "Sensor" means any device, component and/or system that can detect, determine, assess, monitor, measure, quantify and/or sense something. The one or more sensors 122, 124, 126, 128, 130, 132 can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which there are a plurality of sensors, the sensors 122, 124, 126, 128, 130, 132 can work independently from each other. Alternatively, two or more of the sensors 122, 124, 126, 128, 130, 132 can work in combination with each other. In such case, the two or more sensors 122, 124, 126, 128, 130, 132 can form a sensor network. The sensors 122, 124, 126, 128, 130, 132 can be operatively connected to the trunk pressure-relief system 146, the air pressure control module, the HVAC control module, and/or other element of the vehicle 100 (including any of the elements shown in FIG. 1). The sensors 122, 124, 126, 128, 130, 132 can include any suitable type of sensor. Various examples of different types of sensors will be described herein. However, it will be understood that the embodiments are not limited to the particular sensors described.

The sensor system 120 can include one or more door position sensors 132. The door position sensor 132 can be configured to sense a position of the trunk door 148, for example, an open door position or a closed position. The door position sensor 132 can be any suitable sensor. As an example, in a case where the trunk door 148 is connected by a hinge 156 to a trunk door opening 150 receiving the trunk door 148, the door position sensor 132 may include one or more touch-sensitive buttons located along the hinge 156. The one or more touch-sensitive buttons may be spaced along the hinge 156 such that as the trunk door 148 opens or closes, a different touch-sensitive button is making contact with an edge of the trunk door opening 150, generally indicating an angle at which the trunk door 148 is open. The one or more touch-sensitive buttons may be communicatively connected to the air pressure control module, the HVAC control module and/or any other control units.

The sensor system 120 can include one or more door handle touch sensors (not numbered). The door handle touch sensor can be configured to detect when a door handle has been touched and/or moved (e.g. where the user lifts or pulls on the vehicle door handle). In one or more arrangements, the one or more door handle touch sensors may be capacitive touch sensors or resistant touch sensors.

The sensor system 120 can include one or more radar sensors, one or more LIDAR sensors, one or more sonar sensors, one or more proximity sensors and/or one or more cameras 130. The sensors may acquire sensor data 142 in various forms such as still images, video, point clouds, and so on. As an example, the camera 130 may acquire a video of a surrounding environment 154 of the vehicle 100, which may include the position of the trunk door 148. As another example, the video 142 may include images of any users proximate to the vehicle 100. In one or more arrangements, the one or more cameras 130 can be high dynamic range (HDR) cameras or infrared (IR) cameras.

The sensor system 120 can include one or more ambient temperature sensors 122. The ambient temperature sensor(s) 122 can be configured to sense an ambient temperature outside of the vehicle 100. As used herein, "ambient temperature" includes the air temperature of at least a portion of the surrounding environment 154 of the vehicle 100. For instance, the ambient temperature can be the air temperature near an exterior portion of the vehicle 100. The ambient temperature sensor(s) 122 can be any suitable sensor, including mechanical, electrical, and/or integrated circuit temperature sensors that can detect, determine, assess, monitor, measure, quantify, and/or sense an ambient temperature. For example, the ambient temperature sensor(s) 122 can include a mechanical thermometer, a bimetal sensor, a thermistor, a thermocouple, a resistance thermometer, and/or a silicon bandgap sensor. In one or more arrangements, the ambient temperature sensor(s) 122 can be at least partially located at, on, or proximate to an exterior surface of the vehicle 100. In some arrangements, the ambient temperature sensor(s) 122 can be separate from the vehicle 100. For instance, the vehicle 100 can receive signals from an exterior ambient temperature sensor 122. In some examples, the vehicle 100 can receive ambient temperature information from a weather service, a remote server, or application software.

The sensor system 120 can include one or more internal temperature sensors 124 to detect, determine, assess, monitor, measure, quantify, and/or sense an internal temperature of the vehicle 100. "Internal temperature" means an air temperature of at least a portion of the cabin 152. The internal temperature sensor(s) 124 can be any suitable sensor, including mechanical, electrical, and/or integrated circuit temperature sensors. For example, the internal temperature sensor(s) 124 can include a mechanical thermometer, a bimetal sensor, a thermistor, a thermocouple, a resistance thermometer, and/or a silicon bandgap sensor.

The sensor system 120 can include one or more internal and/or external air pressure sensors 126, 128. The internal air pressure sensor(s) 126 can be configured to detect, determine, assess, monitor, measure, quantify, and/or sense an internal air pressure of the vehicle 100. "Internal air pressure" means an air pressure of at least a portion of the cabin 152. The external air pressure sensor(s) 128 can be configured to detect, determine, assess, monitor, measure, quantify, and/or sense an external ambient air pressure of the vehicle 100. As used herein, "external ambient air pressure" includes the air pressure of at least a portion of the surrounding external environment 154 of the vehicle 100. For instance, the external air pressure can be air pressure near an exterior portion of the vehicle 100. The air pressure sensor(s) 126, 128 can be any suitable sensor, including mechanical, electrical, and/or integrated circuit air pressure sensors. As an example, the air pressure sensor(s) 126, 128 can include a magnahelic gauge, which may be configured to sense both the internal air pressure and the external ambient air pressure, and determine the difference between the internal air pressure and the external ambient air pressure.

Some of the possible elements of the vehicle 100 are shown in FIG. 1 and will be described along with subsequent figures. However, a description of many of the elements in FIG. 1 will be provided after the discussion of FIG. 5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a trunk pressure-relief system 146 that is implemented to perform methods and individual function as disclosed herein relating to reducing the air pressure in a trunk 160. The noted functions and methods will become more apparent with a further discussion of the figures.

Figure 2A:
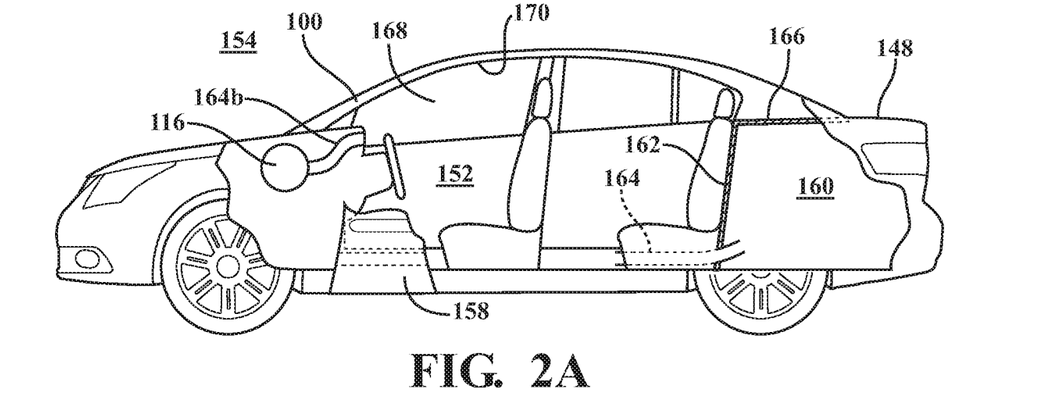
FIGS. 2A-2D illustrate exemplary configurations of a heating, ventilation, and air-conditioning (HVAC) system in a vehicle.

FIGS. 2A-2D illustrate example configurations of the HVAC system 110. FIG. 2A illustrates an HVAC system 110 having a blower 116, an air duct 164, and a second air duct 164b. The air duct 164 fluidly connects the trunk 160 and the cabin 152, and the second air duct 164b fluidly connects the blower 116 and the cabin 152. In this example and as mentioned above, the HVAC system 110, specifically the blower 116 pumps air out of the cabin 152 and exhausts the air to an external environment 154, while the air in the trunk 160 may move through the air duct 164 into the cabin 152 to replace the exhausted air.

Figure 2B:
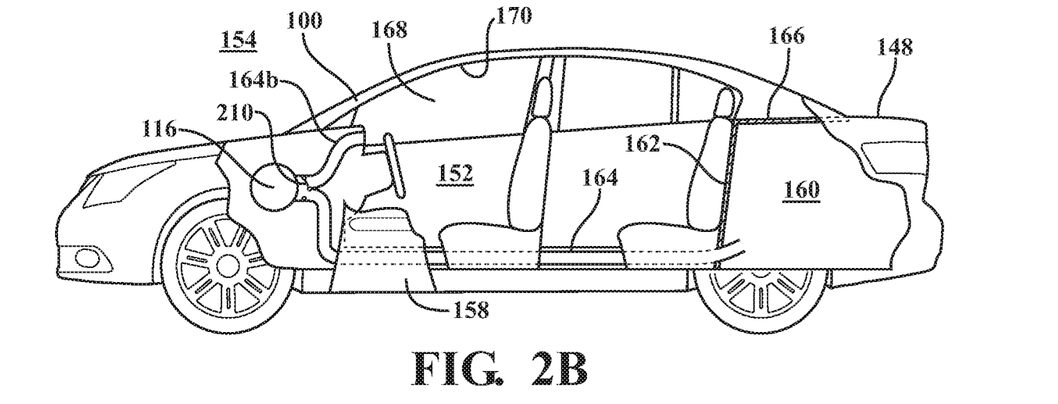

FIG. 2B illustrates an HVAC system having a blower 116, an air duct 164, a second air duct 164b and a valve 210 separating air flowing in the air duct 164 from air flowing in the second air duct 164b. The air duct 164 fluidly connects the trunk and the blower, and the second air duct 164b fluidly connects the cabin and the blower. In this example and as mentioned above, the trunk pressure-relief system controls the valve 210 such that when the HVAC system 110 pumps air out of the trunk and exhausts the air to an external environment 154, the valve 210 is positioned such that the valve 210 blocks air from flowing out of the cabin 152.

Figure 2C:
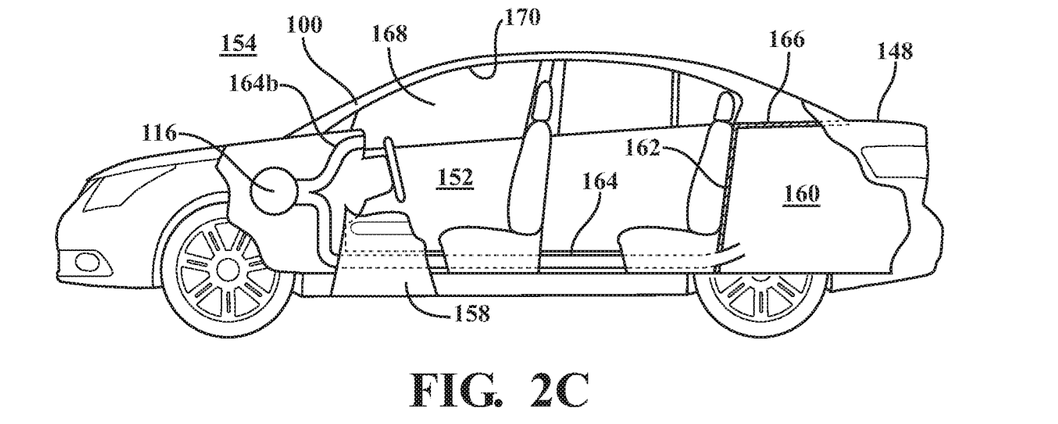

FIG. 2C illustrates an HVAC system 110 having a blower 116, an air duct 164, and a second air duct 164b. The air duct 164 fluidly connects the trunk 160 and the blower 116, and the second air duct 164b fluidly connects the cabin 152 and the blower 116. In this example, the HVAC system 110 pumps air out of the cabin 152 and/or trunk 160, and exhausts the air to an external environment 154.

Figure 2D:
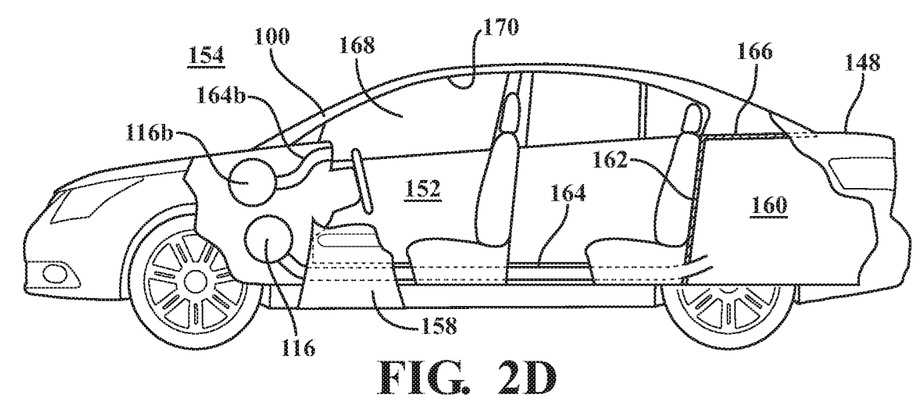

FIG. 2D illustrates an HVAC system having two blowers 116, 116b, an air duct 164 fluidly connected to one of the two blowers 116, and a second air duct 164b fluidly connected to the other of the two blowers 116b. In this example, the one of the two blowers 116 pumps air out of the trunk 160 and exhausts the air to an external environment 154, and the other of the two blowers 116b pumps air out of the cabin 152 and exhausts the air to an external environment 154.

Figure 3A:
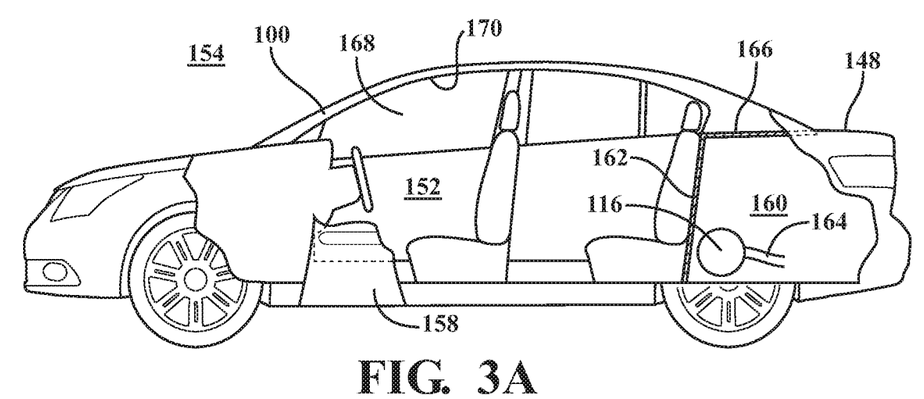
FIGS. 3A-3B illustrate exemplary configurations of an HVAC system in a vehicle.
Figure 3B:
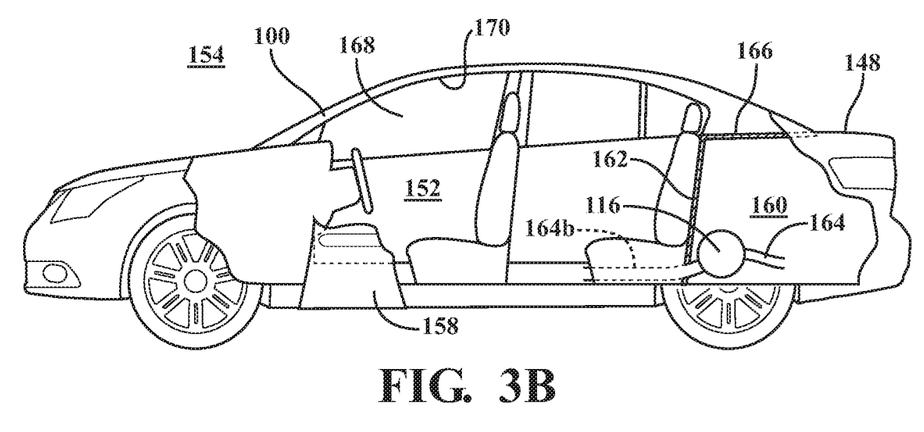

FIGS. 3A-3B illustrate example configurations of the HVAC system 110, where a blower 116 is located in the trunk 160. FIG. 3A illustrates an HVAC system 110 having a blower 116 in the trunk 160. In this example, the trunk 160 does not have an air duct 164 fluidly connected to the cabin 152. As such, the HVAC system 110, specifically the blower 116, pumps air out of the trunk 160 and exhausts the air to an external environment 154, with little to no effect on the air in the cabin 152. As an option, the cabin 152 may be fluidly connected to a second blower 116b.

FIG. 3B illustrates an HVAC system 110 having a blower 116 in the trunk 160 and an air duct 164, extending from the trunk 160 to the cabin 152 and fluidly connecting the trunk 160 and the cabin 152. In this example, the HVAC system 110, specifically the blower 116, pumps air out of the trunk 160 and the cabin 152 and exhausts the air to an external environment 154.

Figure 4:
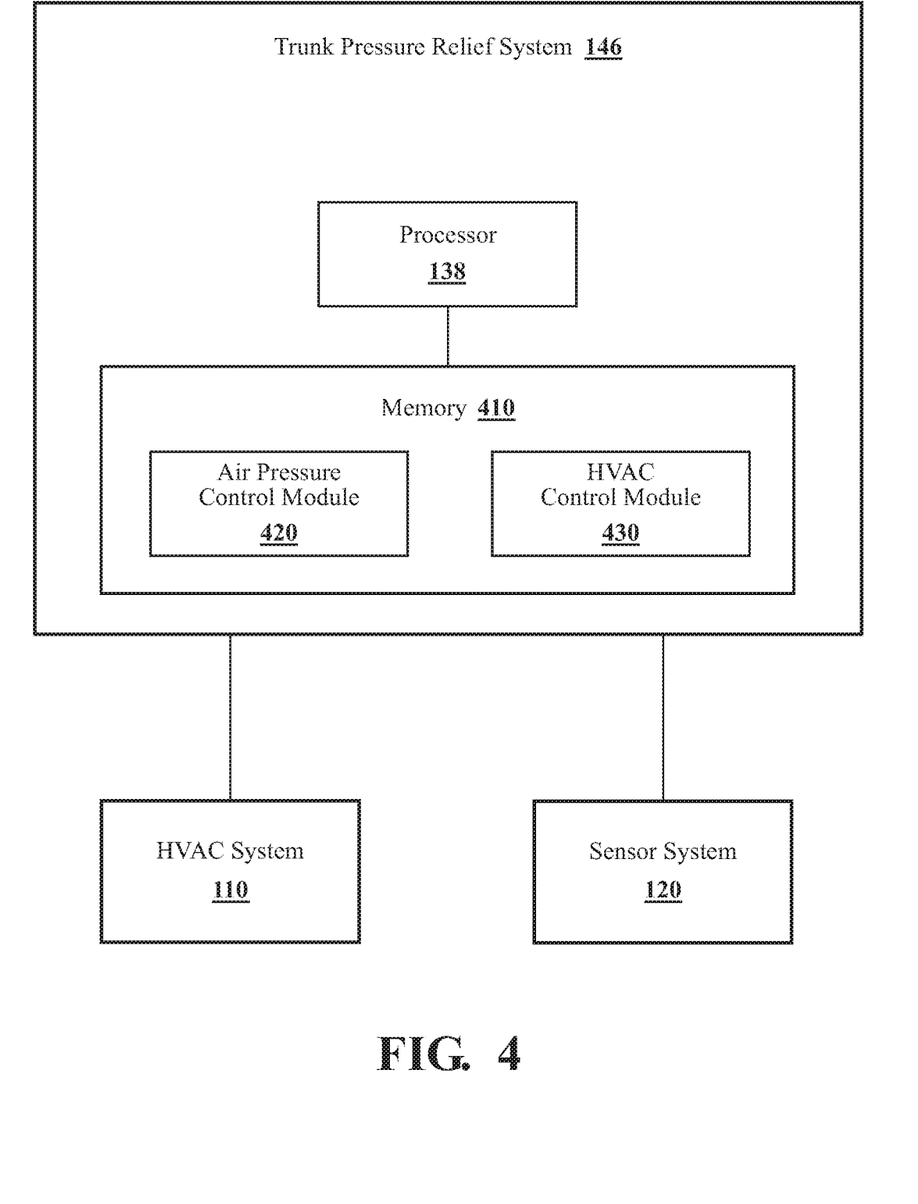
FIG. 4 illustrates one embodiment of a vehicle trunk pressure-relief system that is associated with reducing air pressure in a trunk of the vehicle.

With reference to FIG. 4, one embodiment of the trunk pressure-relief system 146 of FIG. 1 is further illustrated. The trunk pressure-relief system 146 is shown as including a processor 138 from the vehicle 100 of FIG. 1. Accordingly, the processor 138 may be a part of the trunk pressure-relief system 146, the trunk pressure-relief system 146 may include a separate processor from the processor 138 of the vehicle 100 or the trunk pressure-relief system 146 may access the processor 138 through a data bus or another communication path. In either case, it is generally understood that the processor 138 is a microprocessor or other electronic processing device that is configured with computing resources capable of performing the functions (e.g., executing machine learning algorithms) disclosed herein.

In one embodiment, the trunk pressure-relief system 146 includes a memory 410 that stores an air pressure control module 420 and an HVAC control module 430. The memory 410 is a random-access memory (RAM), read-only memory (ROM), a hard disk drive, a flash memory, or other suitable memory for storing the air pressure control module 420 and the HVAC control module 430. The air pressure control module 420 and the HVAC control module 430 are, for example, computer-readable instructions that when executed by the processor 138 cause the processor 138 to perform the various functions disclosed herein.

In one embodiment, the air pressure control module 420 generally includes instructions that function to control the air pressure within the trunk 160 by determining when to activate the HVAC system 110 to pump air out of the trunk 160, and when to deactivate the HVAC system 110 from pumping air out of the trunk 160. In another embodiment, in addition to instructions that function to determine whether to activate the HVAC system 110 to pump air out, the air pressure control module 420 may further include instructions to control the air pressure within the trunk 160 by determining when to activate the HVAC system 110 to pump air into the trunk 160 and when to deactivate the HVAC system 110 from pumping air into the trunk 160.

The air pressure control module 420 may include instructions that function to control the processor 138 to determine an HVAC system rate of pumping air into or out of the trunk 160 based on various factors such as a weight of the trunk door 148. In the case where the trunk door 148 is heavier, the air pressure control module 420 may determine more force is required to close the trunk door 148 and may set the HVAC system rate to a higher value such that more air is pumped out in a shorter period, which may facilitate closing the trunk door 148. In the case where the trunk door 148 is lighter, the air pressure control module 420 may determine less force is required to close the trunk door 148 and may set the HVAC system rate to a lower value.

Further, the air pressure control module 420 generally includes instructions that function to control the processor 138 to receive sensor data 142 from a sensor system 120 of the vehicle 100. The present discussion will focus on collection of sensor data 142 from a door position sensor 132, a camera 130, and pressure sensors 126, 128, however, it should be appreciated that the disclosed approach can be extended to cover further configurations of sensors such as LiDAR sensors, multiple cameras covering a three-hundred and sixty-degree view around the vehicle 100, combinations of different types of cameras, proximity sensors, and so on. Accordingly, the air pressure control module 420, in one embodiment, may control the respective sensors 120 to provide the data inputs in any suitable form to the processor 138.

As an additional note, the air pressure control module 420 can employ various techniques to acquire the sensor data 142 that are either active or passive. For example, the air pressure control module 420 may passively sniff the data inputs from a stream of electronic information provided by the various sensors 120 to further components within the vehicle 100.

In general, as provided for herein, the air pressure control module 420 receives the sensor data 142 from the respective sensors 120 and then may determine based on the sensor data 142, whether to transmit an activation signal or a deactivation signal to the HVAC control module 430 to activate the HVAC system 110 to pump air out of the trunk 160 or deactivate the HVAC system 110 to stop pumping air out of the trunk 160 respectively.

In one embodiment, the HVAC control module 430 generally includes instructions that function to activate the HVAC system 110 to pump air out of the trunk 160, and deactivate the HVAC system 110 from pumping air out of the trunk 160. The HVAC control module 430 may activate the HVAC system 110 in response to an activation signal from the air pressure control module 420. Alternatively, the HVAC control module 430 may activate the HVAC system 110 based on the HVAC control module 430 actively polling and/or passively receiving sensor data 142. As an example, the HVAC control module 430 may activate the HVAC system 110, in response to receiving sensor data 142 from the trunk door position sensor, indicating the trunk door is closing. As another example, the HVAC control module 430 may deactivate the HVAC system 110, in response to receiving sensor data 142 from the trunk door position sensor, indicating the trunk door is closed.

Figure 5:
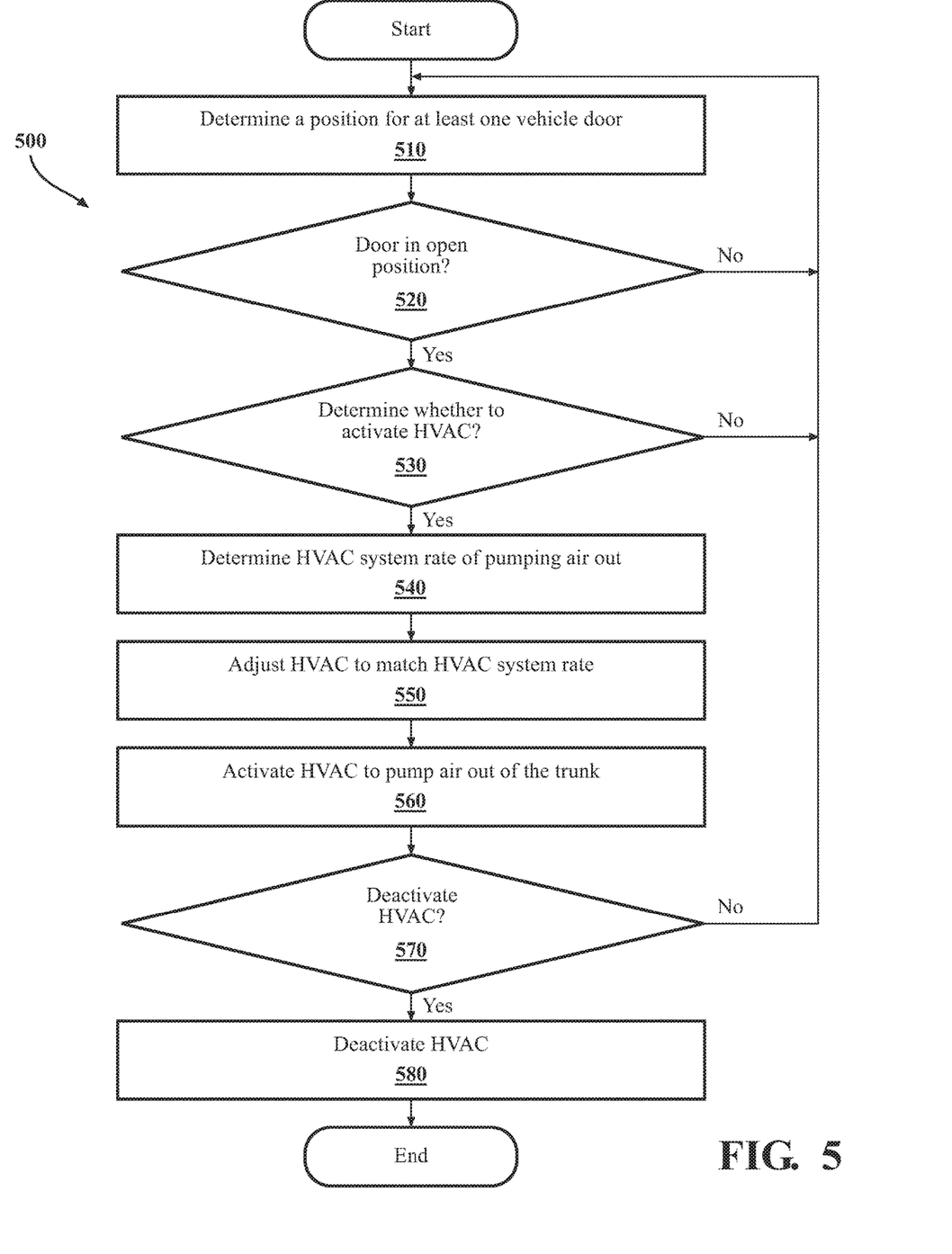
FIG. 5 illustrates one embodiment of a process associated with reducing air pressure in the trunk, in response to detecting a trunk door of the vehicle closing.

Referring now to FIG. 5, an example of a process of reducing air pressure when the trunk door 148 is closing is shown. Various possible steps of process 500 will now be described. The process 500 illustrated in FIG. 5 may be applicable to the embodiments described above, but it is understood that the process 500 can be carried out with other suitable systems and arrangements. Moreover, the process 500 may include other steps that are not shown here, and in fact, the process 500 is not limited to including every step shown in FIG. 5. The steps that are illustrated here as part of the process 500 are not limited to this particular chronological order. Indeed, some of the steps may be performed in a different order than what is shown and/or at least some of the steps shown can occur simultaneously. Process 500 will be discussed from the perspective of the trunk pressure-relief system 146.

At block 510, the air pressure control module 420 determines a position of the trunk door 148. To determine the position of the trunk door 148, the air pressure control module 420 may receive sensor data 142 from the sensors 120, identifying the position of the trunk door 148 as an open position or a closed position. As an example, the sensor may be a door position sensor 132 that detects the position of the trunk door 148, based on one or more touch-sensitive buttons along a hinge 156, as described above. As another example, the sensor may be a camera 130 that acquires images and/or video of an environment proximate to the trunk door 148. The air pressure control module 420 may compare the images 142 received from the camera 130 to images stored in memory 410, to determine whether the trunk door 148 is in the open position or the closed position. As another example, the sensor may be a pressure sensor 128 monitoring an internal air pressure of the trunk 160. In such an example, when the trunk door 148 is opened, the internal air pressure sensor 126 may detect a change in the internal air pressure of the trunk 160 and upon receiving sensor data 142 that the internal air pressure has changed, the air pressure control module 420 may deduce that the trunk door 148 is in the open position. As another example, the air pressure control module 420 may receive a close trunk door request from a door control system, and the air pressure control module 420 may deduce that the trunk door 148 is in the open position.

At decision block 520, the air pressure control module 420 determines whether the trunk door 148 is in the open position. If the trunk door 148 is in the open position, the process 500 proceeds to decision block 530. Otherwise, the process 500 returns to block 510.

At decision block 530, the air pressure control module 420 determines whether to activate the HVAC system 110 to reduce air pressure in the trunk 160. The air pressure control module 420 may determine whether to activate the HVAC system 110 based on various conditions including what sub-position of the open position the trunk door 148 is in, whether the trunk 160 is fluidly connected to an external environment 154 through a vehicle opening that is different from a trunk door opening 150, and/or whether the HVAC system 110 is currently on and blowing (or circulating) cool/warm air in the cabin 152.

As an option and as mentioned above, the air pressure control module 420 may determine whether to activate the HVAC system 110 based on the sub-position of the open position of the trunk door 148. The trunk door 148 may be in one of the following sub-positions—an "open and opening" position, an "open and stationary", and an "open but closing" position. When the trunk door 148 is in the "open and opening" position, the trunk door 148 is spaced and moving away from a trunk door opening 150, which receives the trunk door 148. When the trunk door 148 is in the "open and stationary" position, the trunk door 148 is spaced from the trunk door opening 150 and not moving. When the trunk door 148 is in the "open but closing" position, the trunk door 148 is spaced from the trunk door opening 150 but moving toward the trunk door opening 150.

In the case where the trunk door 148 is in the "open and opening" position, the air pressure control module 420 determines not to activate the HVAC system 110 and the process 500 returns to block 510. However, in the case where the trunk door 148 is in the "open and stationary" position or the "open but closing" position, the air pressure control module 420 may further consider various factors to determine whether to activate the HVAC system 110 to assist in closing the trunk door 148. An example factor may be that the air pressure control module 420 may receive sensor data 142 indicating the trunk door 148 in the open position and an increase in an air pressure level in the trunk 160. Another example factor may include user or manufacturer settings instructing the air pressure control module 420 to activate or not to activate the HVAC system 110 when the trunk door 148 is open and stationary. Another example factor may be a distance between the open trunk door 148 and the trunk door opening 150. In a case whether the trunk door 148 is wide open, e.g., two feet away from the trunk door opening 150, the air pressure control module 420 may not activate the HVAC system 110. In a case whether the trunk door 148 is slightly open, e.g., three inches away from the trunk door opening 150, the air pressure control module 420 may determine to activate the HVAC system 110. Further, in the case where the trunk door 148 is open and moving toward the trunk door opening 150, the air pressure control module 420 may determine to activate the HVAC system 110.

As another option, the air pressure control module 420 may determine whether to activate the HVAC system 110 based on whether the trunk 160 is fluidly connected to an external environment 154 through a vehicle opening (i.e., a second opening) that is different from the trunk door opening 150. In such an example, the air pressure control module 420 may determine that at least one of doors, windows, sunroofs and/or moonroofs is open, based on sensor data 142 and sensors 120 as described above.

Having a second opening may reduce an impact of the HVAC system 110 pumping air out of the trunk 160. In one embodiment, the air pressure control module 420 may determine whether the second opening is a door opening 170 that receives a door 158 and whether the door 158 is closing at generally a same time as the trunk door 148 is closing. In such an example where the door 158 is in the open but closing position, the air pressure control module 420 may determine to activate the HVAC system 110. In another example where the opening is relatively small such as not to significantly reduce the impact of the HVAC system 110 pumping air out of the trunk 160, the air pressure control module 420 may also determine to activate the HVAC system 110.

As another option, the air pressure control module 420 may determine whether to activate the HVAC system 110 based on whether the HVAC system 110 is currently on and blowing (or circulating) cool/warm air in the cabin 152, and the trunk 160 is fluidly connected to the cabin 152. As an example, to determine whether the HVAC system 110 is currently on, the air pressure control module 420 may request and receive a status of the HVAC system 110 from the HVAC control module 430. In a case where the HVAC system 110 is on and the trunk 160 is fluidly connected to the cabin 152, the air pressure control module 420 may consider various factors to determine whether to activate the HVAC system 110 to reduce air pressure in the trunk 160 and the cabin 152. As a first example, a factor may be whether the air pressure control module 420 includes a predetermined setting that instructs the air pressure control module 420 not to activate the HVAC system 110 to reduce air pressure in the when the HVAC system 110 is currently blowing and/or circulating air in the cabin 152. As a second example, a factor may be whether the predicted force from the HVAC system 110 for closing the trunk door 148 (based on the user's size) exceeds a predetermined threshold. In such an example, if the predicted force is below the predetermined threshold, the air pressure control module 420 may not activate the HVAC system 110 to reduce the air pressure in the trunk 160 and the cabin 152. Alternatively, if the predicted force exceeds the predetermined threshold (e.g. a child requiring assistance in closing the trunk door 148), the air pressure control module 420 may activate the HVAC system 110 to reduce air pressure in the trunk 160 and the cabin 152. Other example factors the air pressure control module 420 may consider are a response time for the HVAC system 110 (i.e., how much time does the HVAC system 110 require to switch from blowing air into the cabin 152 to pumping air out of the trunk 160 and the cabin 152), a rate at which air is currently blowing into the cabin 152, and/or a rate at which air would be sucked out of the trunk 160 and the cabin 152 when the HVAC system 110 is pumping air out of the trunk 160 and the cabin 152. The aforementioned factors are examples and do not limit the factors the air pressure control module 420 may consider to determine whether to activate the HVAC system 110 to reduce the air pressure in the trunk 160.

At block 540, the air pressure control module 420 determines an HVAC system rate of pumping air out of the trunk 160. The air pressure control module 420 may determine the HVAC system rate based on various conditions including a size of a user closing the trunk door 148, a location of the trunk door 148 and a blower of the HVAC system 110, at least one of a weight of the trunk door 148 and a closing mechanism. Based on the condition, the air pressure control module 420 can predict or estimate the force required to close the trunk door 148 and determine the HVAC system rate. The HVAC system rate of pumping air out of the trunk 160 includes a period between each pump of air out of the trunk 160 and a volume of air being pumped out in each pump.

As an option and as mentioned above, the air pressure control module 420 may determine the HVAC system rate based on identifying and determining a size of a user proximate to the trunk door 148. In one case, the air pressure control module 420 may identify a user, outside the vehicle 100, approaching and/or touching the trunk door 148, based on video 142 from a camera 130. The air pressure control module 420 may compare the image 142 of the user to stored data in memory 410 to predict a height and/or a weight for the user. Based on the weight and/or the height of the user, the air pressure control module 420 may predict the amount of force the user is capable of applying to close the trunk door 148. The air pressure control module 420 may determine the HVAC system rate of pumping air out required to close the trunk door 148 based on a difference between an estimated force required to close the trunk door 148 and the predicted amount of force the user is capable of applying to close the trunk door 148.

As another option, the air pressure control module 420 may determine the HVAC system rate of pumping air out required to close the trunk door 148 based on a location of the trunk door 148 relative to a location of a blower 116 of the HVAC system 110. The HVAC system rate of pumping air out may be lower for a trunk door 148 located closer to the blower 116 (as shown in FIG. 3A) than for a trunk door 148 located farther from the blower 116 (as shown in FIG. 2A).

As another option, the air pressure control module 420 may determine the HVAC system rate of pumping air out required to close the trunk door 148 based on at least one of a weight of the trunk door 148 and an opening/closing mechanism for the trunk door 148. In other words, the air pressure control module 420 may estimate a force for closing a trunk door of a certain weight and employing a certain opening/closing mechanism. In the case where the trunk door 148 is heavier and the opening/closing mechanism is weaker, the air pressure control module 420 may estimate more force to close the trunk door 148, and may determine the HVAC system rate be set to a higher value. In the case where the trunk door 148 is lighter and the opening/closing mechanism is stronger, the air pressure control module 420 may estimate less force to close the trunk door 148 and may determine the HVAC system rate be set to a lower value.

The air pressure control module 420 may determine the HVAC system rate of pumping air out based on the determined force. As an example, the HVAC system rate of pumping air out may be directly proportional to the determined force, i.e., the more force required to close the trunk door 148, the higher the HVAC system rate of pumping air out.

At block 550, the air pressure control module 420 may transmit the determined HVAC system rate to the HVAC control module 430, based on the estimated force for closing the trunk door 148. In response to receiving the determined HVAC system rate, the HVAC control module 430 can adjust the HVAC system 110 to the determined HVAC system rate.

At block 560, the HVAC control module 430 activates the HVAC system 110 to pump air out of the trunk 160. As an example, in response to determining that the HVAC system 110 should be activated to reduce air pressure in the trunk 160, the air pressure control module 420 transmits an activation signal to the HVAC control module 430, activating the HVAC system 110 to pump air out of the trunk 160. The air pressure control module 420 may further transmit to the HVAC control module 430 the rate at which to pump air out and the volume of air in each pump, based on the predicted force for closing the trunk door 148.

At decision block 570, the air pressure control module 420 determines when to deactivate the HVAC system 110 from reducing air pressure in the trunk 160 of the vehicle 100. The air pressure control module 420 may determine when to deactivate the HVAC system 110 based on various conditions including a predetermined period of time, the position of the trunk door 148, and/or the air pressure measured in the trunk 160.

As an option and as mentioned above, the air pressure control module 420 may determine to deactivate the HVAC system 110 based on a predetermined period of time. As an example, the period may be a predetermined value (such as 5 seconds) stored in the data store 140 (e.g., by the manufacturer or by the user) that may be retrieved by the air pressure control module 420. As another example, the period may be calculated based on the force to be applied to close the trunk door 148 and the rate at which the air is being pumped out of the trunk 160. The air pressure control module 420 may apply the retrieved and/or calculated value to an internal timer, to count down the period. When the time period expires, the process 500 proceeds to block 580.

As another option, the air pressure control module 420 may determine to deactivate the HVAC system 110 based on the position of the trunk door 148, e.g., when the trunk door 148 is in the closed position. The air pressure control module 420 may receive sensor data 142 indicating that the trunk door 148 is in the closed position and the process 500 may then proceed to block 580.

As another option, the air pressure control module 420 may determine to deactivate the HVAC system 110 based on the air pressure measured in the trunk 160, e.g., when the air pressure in the trunk 160 is below a predetermined air pressure threshold. The predetermined air pressure threshold may be set by the manufacturer. In such an example, the air pressure control module 420 may receive an internal air pressure value for the trunk 160 from the internal air pressure sensor 126 and compare the internal air pressure value to the predetermined air pressure threshold. As another example, the air pressure control module 420 may receive an internal air pressure of the trunk 160 and an external air pressure from the internal and external air pressure sensors, respectively, determine a difference between the internal and external air pressures and if the difference is within a predetermined range, the process 500 may proceed to block 580.

At block 580, the air pressure control module 420 may send a deactivation signal to the HVAC control module 430 to stop the HVAC system 110 from pumping out air from the trunk 160. In response to receiving the instruction to stop, as an example where the trunk 160 is fluidly connected to the cabin 152, the HVAC system 110 may stop pumping out air from the trunk and the cabin 152, and return to blowing (or circulating) cool/warm air in the cabin 152. As an alternative, the HVAC system 110 may be deactivated and turned off.

As an additional note, options mentioned in the process 500 above may be used individually or in combination with one another. As an example, the air pressure control module 420 may determine the HVAC system rate based on identifying and determining a size of a user and on a location of the trunk door 148 relative to a location of a blower 116 of the HVAC system 110. As another example, the air pressure control module 420 may determine to deactivate the HVAC system 110 based on a combination of the position of the trunk door 148 and the air pressure measured in the trunk 160.

A non-limiting example of the operation of the trunk pressure-relief system 146, the air pressure control module 420, and the HVAC control module 430 in accordance with the process 500 will now be described. In one or more arrangements, the door position sensor 132 may sense the position of the trunk door 148 and provide the trunk door position to the air pressure control module 420. In response to the trunk door 148 being in an open position, the air pressure control module 420 may probe door position sensors for other doors, to determine if any other doors are in the open position. In the case where no other doors are in open position, the air pressure control module 420 may receive sensor data 142 (such as images or video from a camera) about a user near the trunk door 148. The air pressure control module 420 may compare the profile of the user in the images 142 to data in memory 410 to estimate the user's height and/or weight. The air pressure control module 420 may then predict an amount of force a user of the estimated height and/or weight may be capable of applying to close the trunk door 148. Based on the predicted amount of force, the air pressure control module 420 may calculate an amount of force for assisting the user in closing the trunk door 148, as well as a rate of pumping air out of the trunk 160, and a volume of air to be removed in each pump.

The air pressure control module 420 may send an activation signal to the HVAC control module 430, activating the HVAC system 110 to pump out air from the trunk 160 based on the calculated rate and volume. In one or more arrangements, the air pressure control module 420 may wait for information from the door position sensor 132 indicating that the trunk door 148 is in the closed position. In response to receiving that the trunk door 148 is in the closed position, the air pressure control module 420 may send a deactivation signal to the HVAC control module 430, deactivating the HVAC system 110 from pumping out air from the trunk 160.

It will be appreciated that arrangements described herein can provide numerous benefits, including one or more of the benefits mentioned herein. Arrangements described herein can assisting in closing the trunk door 148 by reducing the air pressure in the trunk 160.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

The vehicle 100 can include a powertrain 102 to generate power. As used herein, "powertrain" can include any component or group of components of the vehicle 100 that generates and/or transfers power used by the vehicle 100 for movement. In one or more arrangements, the powertrain 102 can include an engine and an energy source to generate power. The engine can be any suitable type of engine or motor, now known or later developed. For instance, the engine can be an internal combustion engine, an electric motor, a steam engine, and/or a Stirling engine, just to name a few possibilities. In some embodiments, the engine can include a plurality of engine types. For instance, a gas-electric hybrid vehicle can include a gasoline engine and an electric motor.

The energy source can be any suitable source of energy that can be used to at least partially power the engine. The engine can be configured to convert energy from the energy source into mechanical energy. Examples of energy sources include gasoline, diesel, propane, hydrogen, other compressed gas-based fuels, ethanol, solar panels, batteries, and/or other sources of electrical power. Alternatively or in addition, the energy source can include fuel tanks, batteries, capacitors, and/or flywheels. In some embodiments, the energy source can be used to provide energy for other systems of the vehicle 100.

The vehicle 100 can include battery 104 to store electrical energy for the vehicle 100. The battery 104 can provide electrical energy to power a variety of vehicle systems. For instance, the battery 104 can power a vehicle ignition system, lights, on-board electronics, as well as any other electronic device connected within the vehicle 100. In one or more arrangements, the battery 104 can be a lead-acid battery including six 2.1 volt cells to provide a nominally 12-volt battery system. The battery 104 can be configured for recharging by an engine of the powertrain 102. In one or more arrangements, the battery 104 can provide an energy source for the powertrain 102.

The vehicle 100 can include one or more data stores 140 for storing one or more types of data. The data store 140 can include volatile and/or non-volatile memory. Examples of suitable data stores 140 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 140 can be a component of the HVAC system 110, the sensor system 120 or the trunk pressure-relief system 146. Alternatively the data store 140 may be a standalone component that can be operatively connected to the HVAC system 110, the sensor system 120 and/or the trunk pressure-relief system 146 for use thereby. The term "operatively connected," as used throughout this description, can include direct or indirect connections, including connections without direct physical contact. In one or more arrangements, the data store(s) 140 can include sensor data 142. Further, the data store(s) 140 may include instructions to allow the HVAC control module 430 to operate one or more elements of the HVAC system 110.

The vehicle 100 can include one or more user interface(s) 144. In one or more arrangements, the user interface(s) 144 can include an input system and/or an output system. An "input system" includes any device, component, system, element or arrangement or groups thereof that enable information/data to be entered into a machine. The input system can receive an input from a user (e.g. a driver or a passenger). Any suitable input system can be used, including, for example, a keypad, display, touch screen, multi-touch screen, button, joystick, mouse, trackball, microphone and/or combinations thereof. An "output system" includes any device, component, system, element or arrangement or groups thereof that enable information/data to be presented to a user. The output system can present information/data to a user. The output system can include a display. Alternatively or in addition, the output system may include a microphone, earphone and/or speaker. Some components of the vehicle 100 may serve as both a component of the input system and a component of the output system. In one or more arrangements, the user interface(s) 144 can include a vehicle head unit.

The vehicle 100 can include one or more actuators 134. The actuators 134 can be any element or combination of elements operable to modify, adjust and/or alter one or more components of the HVAC system 110 and/or the vehicle 100 responsive to receiving signals or other inputs from components such as the air pressure control module 420 and/or the HVAC control module 430. Any suitable actuator 134 can be used. For instance, the one or more actuators 134 can include motors, pneumatic actuators, hydraulic pistons, relays, solenoids, and/or piezoelectric actuators, just to name a few possibilities.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method for assisting in closing a trunk door of a vehicle, the method comprising:
  using at least one sensor to detect a position of the trunk door;
  using an air pressure control module to determine whether to activate a Heating, Ventilation and Air-conditioning (HVAC) system to reduce air pressure in a trunk of the vehicle based on the position of the trunk door, wherein the trunk and the HVAC system are fluidly connected by an air duct;
  in response to determining to activate the HVAC system to reduce the air pressure in the trunk, using an HVAC control module to control the HVAC system to pump air out of the trunk through the air duct such that at least some of any increased air pressure caused by closing the trunk door is removed from the trunk; and
  using the air pressure control module to determine whether to deactivate the HVAC system to stop pumping the air out of the trunk based on the position of the trunk door.

2. The method of claim 1, further comprising:
  determining an HVAC system rate of pumping the air out of the trunk through the air duct; and
  adjusting the HVAC system to pump the air out of the trunk through the air duct according to the HVAC system rate.

3. The method of claim 2, wherein determining the HVAC system rate of pumping the air out of the trunk through the air duct, further comprises:
  determining a size of a user closing the trunk door;
  estimating a force from the user to close the trunk door based on the user's size; and
  wherein the HVAC system rate of pumping the air out of the trunk is at least based on the estimated force.

4. The method of claim 2, wherein determining the HVAC system rate of pumping the air out of the trunk through the air duct, further comprises:
  identifying a weight of the trunk door;
  estimating a force required to close the trunk door based on at least the weight of the trunk door; and
  wherein the HVAC system rate of pumping the air out of the trunk is at least based on the estimated force.

5. The method of claim 1, wherein the HVAC system comprises a blower, wherein the blower is fluidly connected to each of the trunk and a cabin of the vehicle.

6. The method of claim 1, wherein the HVAC system comprises:
  a blower fluidly connected to the trunk; and
  a second blower fluidly connected to a cabin of the vehicle.

7. The method of claim 1, wherein determining whether to activate the HVAC system to reduce the air pressure in the trunk of the vehicle further comprises:
  detecting an opening on the vehicle, wherein the opening on the vehicle is different from a trunk door opening for receiving the trunk door; and
  determining whether, based on the opening on the vehicle, to activate the HVAC system to pump the air out of the trunk.

8. The method of claim 7, wherein a cabin of the vehicle is fluidly connected to the trunk, wherein the opening on the vehicle includes a vehicle door opening for receiving a vehicle door, further comprising:
  detecting a position of the vehicle door;
  when the position of the vehicle door is an open position and the vehicle door is stationary, determining whether to activate the HVAC system to reduce the air pressure in the trunk; and
  when the position of the vehicle door is the open position and the vehicle door is moving toward a closed position, determining to activate the HVAC system to reduce the air pressure in the trunk.

9. The method of claim 1, further comprising:
  detecting an air pressure level in the trunk, wherein the determination of whether to activate the HVAC system to reduce the air pressure in the trunk occurs when the position of the trunk door is the open position and an increase in the air pressure level is detected.

10. The method of claim 1, further comprising:
  deactivating the HVAC system to stop pumping the air out of trunk through the air duct after a predetermined period of time.

11. A trunk pressure-relief system for assisting in closing a trunk door of a vehicle, comprising:
- at least one sensor operable to detect a position of the trunk door;
- a Heating, Ventilation and Air-conditioning (HVAC) system;
- one or more processors;
- a memory communicably coupled to the one or more processors and storing:
  - an air pressure control module including instructions that when executed by the one or more processors cause the one or more processors to, determine whether to activate the HVAC system to reduce air pressure in a trunk of the vehicle based on the position of the trunk door, wherein the trunk and the HVAC system are fluidly connected by an air duct; wherein, in response to determining to activate the HVAC system to reduce the air pressure in the trunk, the HVAC system pumps air out of the trunk through the air duct such that at least some of any increased air pressure caused by closing the trunk door is removed from the trunk; and
  - an HVAC control module including instructions that when executed by the one or more processors cause the one or more processors to deactivate the HVAC system to stop pumping the air out from the trunk based on the position of the trunk door.

12. The trunk pressure-relief system of claim 11, wherein the air pressure control module further includes instructions that when executed by the one or more processors cause the one or more processors to determine an HVAC system rate of pumping the air out of the trunk through the air duct, wherein the HVAC control module further includes instructions that when executed by the one or more processors cause the one or more processors to adjust the HVAC system to pump the air out of the trunk according to the HVAC system rate.

13. The trunk pressure-relief system of claim 12, wherein the instructions to determine the HVAC system rate of pumping the air out of the trunk further include instructions that when executed by the one or more processors cause the one or more processors to:
- determine a size of a user closing the trunk door;
- estimate a force from the user to close the trunk door based on the user's size; and
- wherein the HVAC system rate of pumping the air out of the trunk is at least based on the estimated force.

14. The trunk pressure-relief system of claim 11, further comprising:
- a blower, wherein the blower is fluidly connected to each of the trunk and a cabin of the vehicle.

15. The trunk pressure-relief system of claim 11, further comprising:
- a blower fluidly connected to the trunk; and
- a second blower fluidly connected to a cabin of the vehicle.

16. The trunk pressure-relief system of claim 11, further comprising at least one sensor operable to detect an opening on the vehicle, wherein the opening on the vehicle is different from a trunk door opening for receiving the trunk door; and
- wherein the air pressure control module further includes instructions that when executed by the one or more processors cause the one or more processors to, determine whether, based on the opening on the vehicle, to activate the HVAC system to reduce the air pressure in the trunk.

17. The trunk pressure-relief system of claim 16, wherein a cabin of the vehicle is fluidly connected to the trunk, wherein the opening on the vehicle is a vehicle door opening for receiving a vehicle door, further comprising at least one sensor operable to detect a position of the vehicle door; and
- wherein the air pressure control module further includes instructions that when executed by the one or more processors cause the one or more processors to,
  - when the position of the vehicle door is an open position and the vehicle door is stationary, determine whether to activate the HVAC system to reduce the air pressure in the trunk; and
  - when the position of the vehicle door is the open position and the vehicle door is moving toward a closed position, determine to activate the HVAC system to reduce the air pressure in the trunk.

18. The trunk pressure-relief system of claim 11, further comprising:
- one or more sensors operable to detect an air pressure level in the trunk; and
- wherein the air pressure control module further includes instructions that when executed by the one or more processors cause the one or more processors to determine whether to activate the HVAC system to reduce the air pressure in the trunk when the position of the trunk door is in the open position and an increase in the air pressure level is detected.

19. A trunk pressure-relief system for assisting in closing a trunk door of a vehicle, comprising:
- at least one sensor operable to detect a position of the trunk door;
- a Heating, Ventilation and Air-conditioning (HVAC) system, wherein the HVAC system has a blower in a trunk of the vehicle;
- one or more processors;
- a memory communicably coupled to the one or more processors and storing:
  - an air pressure control module including instructions that when executed by the one or more processors cause the one or more processors to determine whether to activate the HVAC system to reduce air pressure in the trunk of the vehicle based on the position of the trunk door; wherein, in response to determining to activate the HVAC system to reduce air pressure in the trunk, the HVAC system pumps air out of the trunk through the blower such that at least some of any increased air pressure caused by closing the trunk door is removed from the trunk; and
  - an HVAC control module including instructions that when executed by the one or more processors cause the one or more processors to deactivate the HVAC system to stop pumping the air out from the trunk based on the position of the trunk door.

20. The trunk pressure-relief system of claim 19, further comprising:
- an air duct fluidly connecting a cabin of the vehicle to the blower.

* * * * *